United States Patent
Liu

(10) Patent No.: US 8,064,883 B2
(45) Date of Patent: Nov. 22, 2011

(54) MOBILE TERMINAL HAVING ANTI-THEFT FUNCTION AND ANTI-THEFT METHOD

(75) Inventor: Young-Way Liu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 752 days.

(21) Appl. No.: 12/127,932

(22) Filed: May 28, 2008

(65) Prior Publication Data

US 2009/0270126 A1 Oct. 29, 2009

(30) Foreign Application Priority Data

Apr. 24, 2008 (CN) .......................... 2008 1 0301290

(51) Int. Cl.
*H04M 1/66* (2006.01)
*H04K 3/00* (2006.01)

(52) U.S. Cl. ........................................ 455/411; 455/558
(58) Field of Classification Search .......... 455/410–411, 455/558; 713/182, 184; 726/28, 34–35
See application file for complete search history.

(56) References Cited

U.S. PATENT DOCUMENTS

| 7,174,159 B2* | 2/2007 | Guirauton et al. | 455/411 |
| 7,233,785 B2* | 6/2007 | Yamagishi et al. | 455/411 |
| 2008/0161050 A1* | 7/2008 | Shudark et al. | 455/558 |

FOREIGN PATENT DOCUMENTS

| CN | 1407787 A | 4/2003 |
| CN | 1487763 A | 4/2004 |
| CN | 1933629 A | 3/2007 |

* cited by examiner

*Primary Examiner* — Lee Nguyen
(74) *Attorney, Agent, or Firm* — Altis Law Group, Inc.

(57) ABSTRACT

A mobile terminal includes a central process unit (CPU), a subscriber identity module (SIM) card unit for loading a SIM card, and a memory unit having a register and an anti-theft module. The anti-theft module includes an encrypting/binding module capable of being instructed by the CPU to bind an anti-theft password to the SIM card and save the anti-theft password to the register of the memory unit, a password comparing module capable of being instructed by the CPU to compare the anti-theft password with data of an actual SIM card loaded in the mobile terminal, a locking/unlocking module capable of being instructed by the CPU to lock or unlock the mobile terminal, and a data deleting module capable of being instructed by the CPU to delete data of the memory unit.

10 Claims, 3 Drawing Sheets

MOBILE TERMINAL HAVING ANTI-THEFT FUNCTION AND ANTI-THEFT METHOD

BACKGROUND

1. Field of the Invention

The present invention relates to mobile terminals such as a cellular telephone, and particular to a mobile terminal having anti-theft function.

2. Description of related art

Nowadays, cellular telephones are widely used. It is usually possible to store data in, such as telephone numbers, address lists, password data, or other private information. If a cellular telephone is stolen, the owner may suffer not only the financial loss, but also loss of private information.

What is needed is to provide a mobile terminal with extra anti-theft functions.

SUMMARY

An embodiment of a mobile terminal includes a central process unit (CPU), a subscriber identity module (SIM) card unit for loading a SIM card, and a memory unit having a register and an anti-theft module. The anti-theft module includes an encrypting/binding module capable of being instructed by the CPU to bind an anti-theft password to the SIM card and save the anti-theft password to the register of the memory unit, a password comparing module capable of being instructed by the CPU to compare the anti-theft password with data of an actual SIM card loaded in the mobile terminal, a locking/unlocking module capable of being instructed by the CPU to lock or unlock the mobile terminal, and a data deleting module capable of being instructed by the CPU to delete data of the memory unit.

Other advantages and novel features of the present invention will become more apparent from the following detailed description of an embodiment when taken in conjunction with the accompanying drawings, in which:

DETAILED DESCRIPTION

Figure 1:
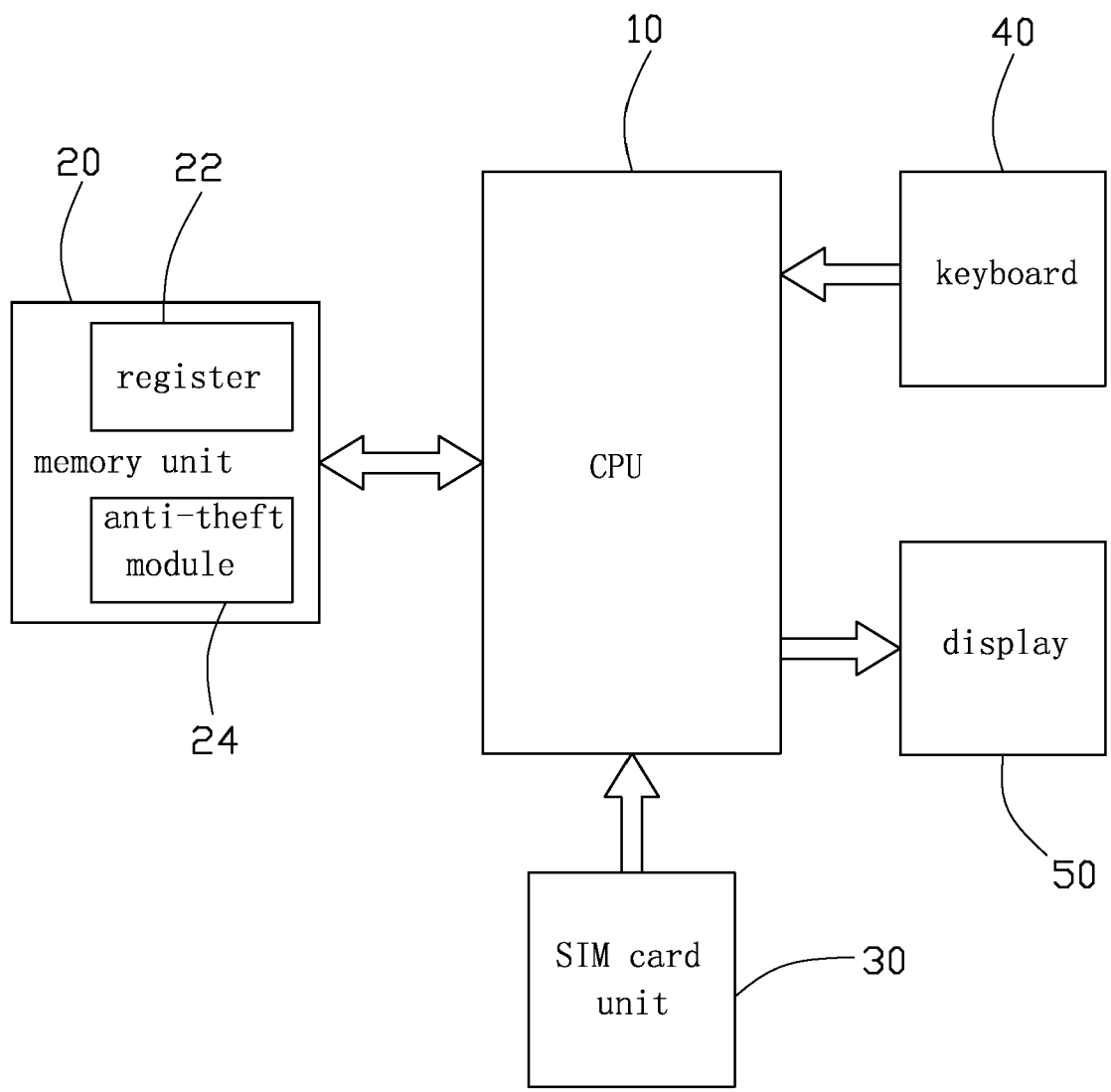
FIG. 1 is a partial block diagram of a mobile terminal having an anti-theft module accordance with an embodiment of the present invention.
Figure 2:
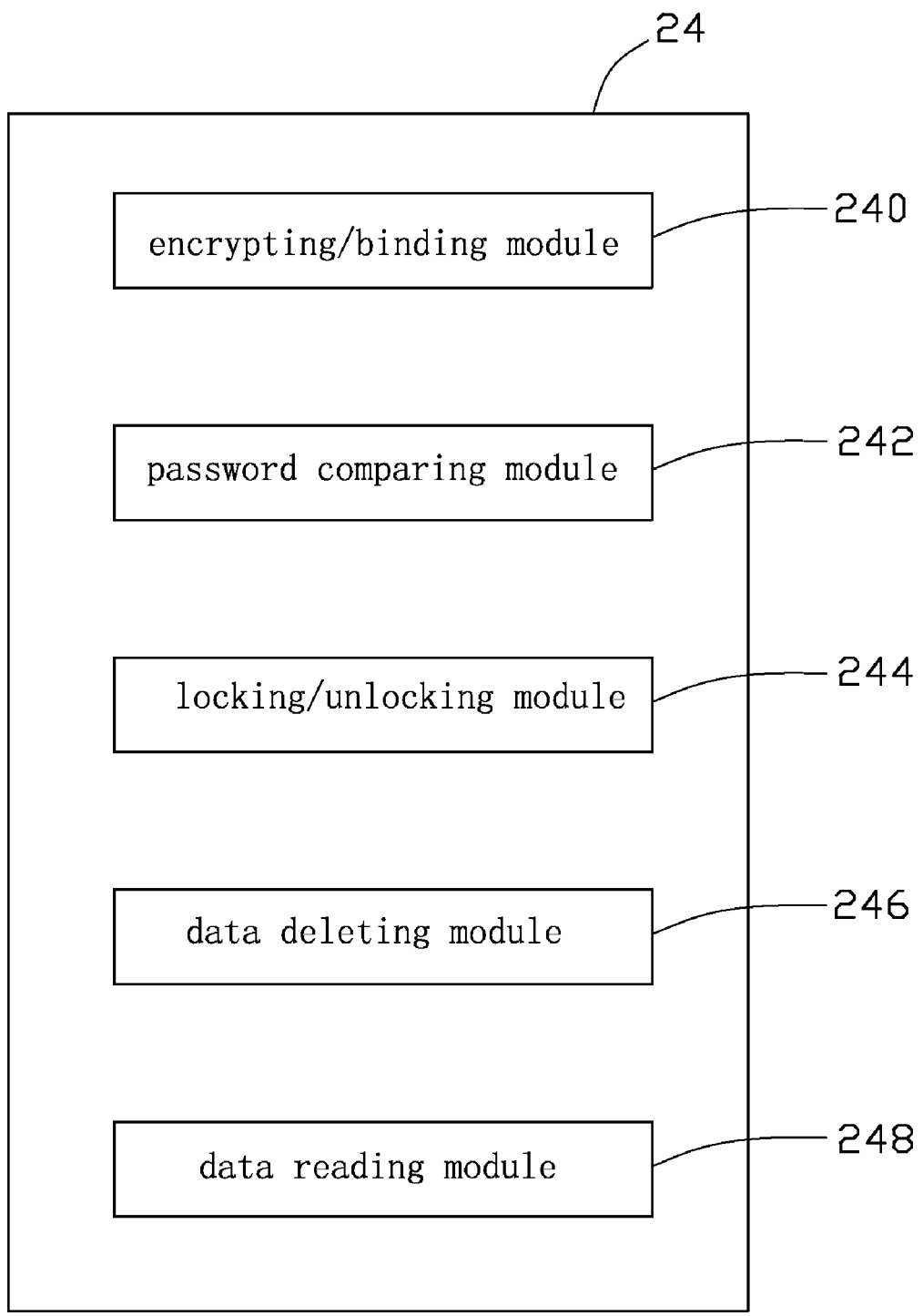
FIG. 2 is a block diagram of the anti-theft module of the mobile terminal of FIG. 1.

Referring to FIGS. 1 and 2, a mobile terminal, which may be a cellular telephone, in accordance with an embodiment of the present invention includes a central process unit (CPU) 10, a memory unit 20, a subscriber identity module (SIM) card unit 30, a keyboard 40, a display 50, and other auxiliary circuits and elements (not shown).

The memory unit 20 includes a register 22 and an anti-theft module 24 for processing anti-theft programs. The CPU 10 is connected to the memory unit 20 to activate the anti-theft programs. The SIM card unit 30 is used for loading a SIM card (not shown), so that the CPU 10 can communicate with the SIM card. The keyboard 40 is connected to the CPU 10, thereby users can input commands and responses relating to the anti-theft programs. The display 50 is used for displaying operating window for users to use the mobile terminal.

The anti-theft module 24 includes an encrypting/binding module 240, a password comparing module 242, a locking/unlocking module 244, a data deleting module 246, and a data reading module 248. The aforementioned modules are used for running the anti-theft programs.

The memory unit 20 is capable of storing data therein for an owner of the mobile terminal. When the owner first uses the mobile terminal, he/she insert a SIM card into the SIM card unit 30. After turning on the mobile terminal, a password input window is shown in the display 50, thereby the owner can input an anti-theft password via the keyboard 40. Then the CPU 10 instructs the encrypting/binding module 240 of the anti-theft module 24 to bind the anti-theft password to the SIM card and save the anti-theft password to the register 22 of the memory unit 20.

Figure 3:
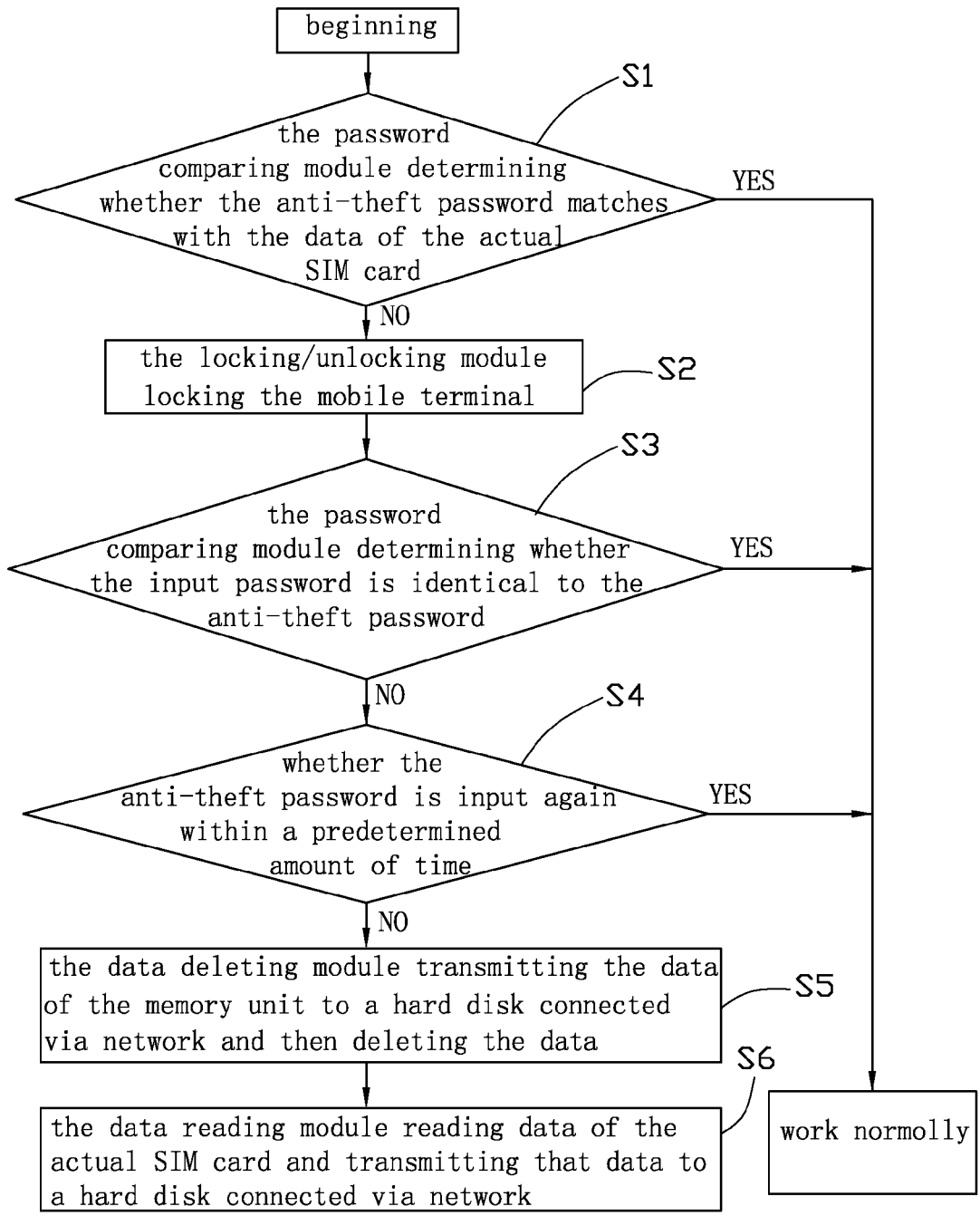
FIG. 3 is a flow chart of an embodiment of an anti-theft method applied to the mobile terminal of FIG. 1.

Referring also to FIG. 3, an anti-theft method of the mobile terminal in accordance with an embodiment of the present invention includes the following steps.

S1: when a user (may be the owner, an authorized user, or an unauthorized user) turns on the mobile terminal, the CPU 10 instructs the password comparing module 242 of the anti-theft module 24 to compare the anti-theft password saved in the register 22 with data of an actual SIM card loaded in the mobile terminal. If the anti-theft password matches with the data of the actual SIM card, the mobile terminal will work normally.

S2: If the anti-theft password doesn't match with the data of the actual SIM card, namely the user uses a new SIM card different from the SIM card first loaded by the owner, the CPU 10 instructs the locking/unlocking module 244 of the anti-theft module 24 to lock the mobile terminal.

S3: After locking the mobile terminal, the password input window is shown again to enable the user to input a password. The CPU 10 instructs the password comparing module 242 of the anti-theft module 24 to determine whether the input password is identical to the anti-theft password. If the input password is identical to the anti-theft password, the CPU 10 instructs the locking/unlocking module 244 of the anti-theft module 24 to unlock the mobile terminal, and then the CPU 10 instructs the encrypting/binding module 240 of the anti-theft module 24 to bind the anti-theft password to the new SIM card. The mobile terminal will then work normally.

S4: If the new password is not the anti-theft password, the CPU 10 instructs the data deleting module 246 of the anti-theft module 24 to record the password error event and start a countdown for a predetermined amount of time, such as 24 hours. If the user inputs a correct password, i.e., the anti-theft password, within the predetermined amount of time, the CPU 10 instructs the locking/unlocking module 244 of the anti-theft module 24 to unlock the mobile terminal, and then the CPU 10 instructs the encrypting/binding module 240 of the anti-theft module 24 to bind the anti-theft password to the new SIM card. The mobile terminal will then work normally.

S5: If the user fails to input the anti-theft password within the of the predetermined amount of time, the CPU 10 instructs the data deleting module 246 of the anti-theft module 24 to transmit the useful data to a hard disk connected via network supplied by mobile telecom carrier for later retrieval by the owner, and then delete the data of the memory unit 20.

S6: After deleting the data, the CPU 10 instructs the data reading module 248 to read data of the new unauthorized SIM card and transmit that data to the a hard disk connected via network supplied by the mobile telecom carrier, which then can be available to police to aid in investigation of the theft or loss of the mobile terminal.

Because the anti-theft password is bound to the SIM card, unless the SIM card is changed, the owner need not input the anti-theft password each time, which is very convenient. Furthermore, the owner can use another mobile terminal or a network computer to input a locking command or a deleting command, and the mobile terminal receives the locking command or the deleting command, and then the CPU 10 instructs the locking/unlocking module 244 or the data deleting module 246 of the anti-theft module 24 to lock the mobile terminal or delete the useful data of the memory unit 20.

For example, when a cellular telephone having the anti-theft module 24 is stolen, the owner of the cellular telephone can use another cellular telephone or a network computer to input a locking command, and the mobile terminal receives the locking command, and then the CPU 10 instructs the locking/unlocking module 244 of the anti-theft module 24 to lock the cellular telephone. Thereby unauthorized person or persons cannot use the cellular telephone via the owner's SIM card. Even if the unauthorized person/s try using a new SIM card in the cellular telephone, without the anti-theft password, the cellular telephone cannot be used. Thereafter, the unauthorized person may try to employ some decryption methods to decrypt the anti-theft password, however, because of the countdown and the option to the owner to immediately transmit and delete data via remote commands, their window of opportunity is limited. Thus unauthorized access to personal data is prevented, and preservation of the data is achieved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile terminal comprising:
   a central process unit (CPU);
   a subscriber identity module (SIM) card unit capable of loading a SIM card;
   a memory unit capable of storing data therein and comprising a register; and
   an anti-theft module, the anti-theft module comprising:
   an encrypting/binding module capable of being instructed by the CPU to bind an anti-theft password to the SIM card and save the anti-theft password to the register of the memory unit;
   a password comparing module capable of being instructed by the CPU to compare the anti-theft password with data of an actual SIM card loaded in the mobile terminal;
   a locking/unlocking module capable of being instructed by the CPU to lock or unlock the mobile terminal; and
   a data deleting module capable of being instructed by the CPU to delete data of the memory unit, wherein the mobile terminal is capable of receiving a deleting command remotely to cause the CPU to instruct the data deleting module to delete the data of the memory unit.

2. The mobile terminal as claimed in claim 1, wherein the data deleting module is capable of being instructed by the CPU to transmit the data of the memory unit to a hard disk connected via network.

3. The mobile terminal as claimed in claim 1, wherein the anti-theft module further comprises a data reading module capable of being instructed by the CPU to read data of the SIM card and transmit the data to a hard disk connected via network.

4. The mobile terminal as claimed in claim 1, wherein the mobile terminal is a cellular telephone.

5. The mobile terminal as claimed in claim 1, wherein the mobile terminal is capable of receiving a locking command remotely to cause the CPU to instruct the locking/unlocking module to lock the mobile terminal.

6. An anti-theft method comprising:
   providing a mobile terminal according to claim 1;
   the CPU instructing the password comparing module of the anti-theft module to compare the anti-theft password saved in the register with an actual SIM card loaded in the mobile terminal;
   upon a condition that the anti-theft password matches with the data of the actual SIM card, the mobile terminal works normally;
   upon a condition that the anti-theft password does not match with the data of actual SIM card, the CPU instructs the locking/unlocking module of the anti-theft module to lock the mobile terminal;
   the CPU instructs the password comparing module to determine whether a new input password is identical to the anti-theft password, upon a condition that the input password is identical to the anti-theft password, the CPU instructs the locking/unlocking module to unlock the mobile terminal, and then the CPU instructs the encrypting/binding module to bind the anti-theft password to the actual SIM card;
   upon a condition that the new password is no identical to the anti-theft password, the CPU instructs the data deleting module to start a countdown for a predetermined amount of time;
   upon a condition that a user input is identical to the anti-theft password and received within the predetermined amount of time, the CPU instructs the locking/unlocking module to unlock the mobile terminal, and then the CPU instructs the encrypting/binding module to bind the anti-theft password to the actual SIM card; and
   upon a condition that the user input that is identical to the anti-theft password is not received within the predetermined amount of time, the CPU instructs the data deleting module to delete the data of the memory unit, wherein the mobile terminal receives a deleting command remotely to cause the CPU to instruct the data deleting module of the anti-theft module to delete the data of the memory unit.

7. The anti-theft method as claimed in claim 6, further comprising the CPU instructing the data deleting module to transmit the data of the memory unit to a hard disk connected via network.

8. The anti-theft method as claimed in claim 6, wherein upon a condition that the user input that is identical to the anti-theft password is not received within the predetermined amount of time, the anti-theft method further comprises the CPU instructing a data reading module to read data of the actual SIM card and transmit the data to a hard disk connected via network.

9. The anti-theft method as claimed in claim 6, the anti-theft method further comprises the mobile terminal receiving a locking command remotely to cause the CPU to instruct the locking/unlocking module of the anti-theft module to lock the mobile terminal.

10. The anti-theft method as claimed in claim 9, wherein upon a condition that a user input is identical to the anti-theft password and received within the predetermined amount of time, the CPU instructs the locking/unlocking module to unlock the mobile terminal, and then the CPU instructs the encrypting/binding module to bind the anti-theft password to the actual SIM card.

* * * * *